United States Patent [19]

Bradley, Jr. et al.

[11] Patent Number: 5,824,374
[45] Date of Patent: *Oct. 20, 1998

[54] IN-SITU LASER PATTERNING OF THIN FILM LAYERS DURING SEQUENTIAL DEPOSITING

[75] Inventors: Richard Alan Bradley, Jr.; Nancy Lee Schultz Yamasaki; Christopher Wayne Lantman; Bryant Hichwa, all of Santa Rosa, Calif.

[73] Assignee: Optical Coating Laboratory, Inc., Santa Rosa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 681,125

[22] Filed: Jul. 22, 1996

[51] Int. Cl.⁶ ....................................................... B05D 3/00
[52] U.S. Cl. ............................ 427/555; 427/556; 216/65; 216/94; 219/121.69; 205/136
[58] Field of Search ..................................... 427/554, 555, 427/556, 557, 558; 216/65, 66, 94; 219/121.69, 121.71, 121.72, 121.85; 205/128, 136

[56] References Cited

U.S. PATENT DOCUMENTS

| Re. 31,280 | 6/1983 | Yano et al. | 29/592 |
|---|---|---|---|
| 4,508,749 | 4/1985 | Brannon et al. | 427/555 |
| 4,786,358 | 11/1988 | Yamazaki et al. | 427/555 |
| 5,054,894 | 10/1991 | Warszawski | 359/270 |
| 5,056,899 | 10/1991 | Warszawski | 350/357 |
| 5,061,341 | 10/1991 | Kildal et al. | 156/632 |
| 5,076,673 | 12/1991 | Lynam et al. | 359/271 |
| 5,169,678 | 12/1992 | Cole et al. | 427/555 |
| 5,215,864 | 6/1993 | Laakmann | 427/556 |
| 5,281,450 | 1/1994 | Yaniv | 427/530 |
| 5,302,423 | 4/1994 | Tran et al. | 427/555 |
| 5,340,619 | 8/1994 | Chen et al. | 424/498 |
| 5,407,557 | 4/1995 | Iida et al. | 427/556 |
| 5,446,577 | 8/1995 | Bennett et al. | 359/273 |

OTHER PUBLICATIONS

*IBM Tech. Discl. Bull.*, "Debris Elimination following laser Ecthing", vol. 33, No. 9, Feb. 1991.

Ziegler et al, "Flat Panel Display Technology," *The Electrochemical Society Interface*, (Summer 1994) No month.

*Primary Examiner*—Marianne Padgett
*Attorney, Agent, or Firm*—Workman, Nydegger & Seeley

[57] ABSTRACT

The present invention involves in situ laser patterning of thin-film layers during sequential deposition of the different layers. The layers may be applied using any known method of film deposition. The method of the present invention involves laser ablation to remove unwanted portions of the coating layers, including color filter materials, that have been sequentially deposited onto substantially the entire surface of a substrate. By controlling the depth of the laser ablation removal of the deposited films, it is possible to remove any portion of a film or layers of films or coatings that have been sequentially coated onto the surface of the substrate and to thereby control the depth and location of color filter materials coated upon the substrate. This patterning process can be employed in conjunction with any film deposition technique known in the art, including vacuum, wet chemical or dry processing deposition techniques, but is preferred with vacuum deposition. Because both the coating and the selective removal of the coatings by laser ablation can be performed without breaking vacuum, in the case of vacuum deposition, the process greatly simplifies and increases the rate of production of coated arrays, including color filter arrays. In addition, this method allows for the construction of complex pattern, thin film structures without the need for masking encountered with other patterning processes.

20 Claims, 9 Drawing Sheets

IN-SITU LASER PATTERNING OF THIN FILM LAYERS DURING SEQUENTIAL DEPOSITING

BACKGROUND OF THE INVENTION

1. The Field of the Invention

The present invention deals with a process for patterning of thin film layers during sequential deposition onto a substrate. More particularly, the process involves in situ laser patterning of sequentially deposited thin film layers by means of depth-controlled laser ablation.

2. The Relevant Technology

Flat panel display devices have found widespread use in, for example, electronic calculators, clocks, household appliances, audio equipment, computer monitors, etc. It is often desirable for flat panel display devices to have color display capability. For example, a commonly used system for a color filter array is known as the red, green, blue (RGB) system. This type of color filter array may also incorporate a black or otherwise opaque material to improve the contrast, resolution, and optical clarity of the colors produced. Various methods for applying color-producing materials to substrates to produce color filter arrays for use in flat panel displays devices have been developed.

In general, the deposition of coating materials onto substrates may be accomplished under a variety of conditions, such as vacuum, wet chemical, or dry processing thin film deposition techniques. Film deposition processes which employ vacuum include physical vapor deposition (PVD) and chemical vapor deposition (CVD). Film deposition by wet chemical methods may be carried out by the following processes: spin coating, dip coating, precipitation from suspensions or solutions, draw downs, wet applicator bar coatings, and sprays. Wet chemical processes may be used to selectively apply the filter materials in their desired location. Wet chemical processes often require multiple steps in which the coated substrate must be exposed to different processing techniques using equipment in different locations. Vacuum deposition techniques generally require vacuum breaks between film deposition sequences. Breaking vacuum greatly increases the time it takes to manufacture a color filter array and it also can introduce defects or impurities into the color filter array. Finally, dry processes for film coating deposition include spray pyrolysis and laser ablation transfer (LAT).

In the case of some film deposition methods, and particularly in the case of vacuum deposition of films, masking is used to prevent deposition in regions where the film coating is not desired. A problem with masking techniques, however, is that non-uniformity may occur at the interface between the coated and uncoated regions. Moreover, masking of sequentially deposited films usually requires vacuum breaks, as well as transfer of the substrate from the coating processing area to another area, in order to remove the masking prior to depositing the next film layer or to remove the masking and apply a new masking pattern prior to depositing the next film layer. Vacuum breaks and substrate transfers greatly increase the production time and may also permit defects such as impurities or contamination to be introduced into the product.

Photolithography is a method which can be used to selectively remove film coatings deposited by vacuum, wet chemical or dry processes. In this method, a substrate is coated with a photoresist which changes physical properties, typically solubility, upon exposure to light. The photoresist coating is exposed to a selected pattern of light and developed with a solvent rinse such that either the exposed or unexposed photoresist is removed depending on whether a negative or positive working mode is used. Various methods are known, such as gelatin or polyimide dyeing, to incorporate colored filter materials sequentially into selected regions of the coating. A problem with photolithographic techniques is that the chemicals involved may pose environmental hazards. Also, the materials used, such as gelatins, may be rendered less durable by exposure to high temperatures during subsequent processing of the coated substrate, such as during application of an electrode layer or a liquid crystal alignment layer. In addition, the use of photolithographic methods in combination with vacuum deposition requires vacuum breaks and substrate transfer for the photoselective removal of the unwanted photoresist coating between each film deposition and color incorporation sequence.

Some attempts have been made to utilize laser ablation techniques to form regions for placing colored filter materials within a coating on a substrate. One such method may be found in U.S. Pat. No. 5,281,450 in which laser ablation is used to cut openings in an opaque material coating on a substrate such that a non-solid light influencing material can be injected selectively, as by use of ink-jet type injection heads, into the openings and thereafter cured. Another such method may be found in U.S. Pat. No. 5,340,619, in which multiple colored filter materials may be selectively applied, one color at a time, into regions of a coating on a substrate which have been laser ablated. The colored filter materials may be selectively inserted into the ablated regions as by various known deposition methods and each color is then cured before the next color is applied. According to the '619 patent, it is also possible to apply the multiple colored filter materials simultaneously to the substrate by use of a printing plate method. The '619 patent also teaches that either laser ablation or plasma etching may be used to "planarize," i.e., level, the entire surface of a substrate which has been previously coated with multiple colored filter materials. For purposes of disclosure, U.S. Pat. Nos. 5,340,619 and 5,281,450 are incorporated herein by specific reference.

As seen from the above-described patents, laser ablation has been used to create patterned openings in a coating upon a substrate such that colored filter material may be selectively applied within the openings. Laser ablation has also been used, in a manner similar to plasma etching, to level the coatings upon a coated substrate, i.e., to non-selectively and simultaneously remove all of the coatings upon a substrate to some predetermined level. Various methods have been used to selectively fill the laser-created openings with colored filter material. The selectively applied coatings are then cured. In the '619 patent, one example of non-selective deposition of the colored filter materials is disclosed. This method applies a removable release layer before the colored filter material to permit selective removal of the color from regions outside of the laser ablated regions. The deposition techniques disclosed are, thus, similar to conventional masking or photolithographic techniques in that careful control and, often, multiple processing steps are required.

It will be appreciated from the foregoing that known methods to selectively position differently colored filter materials onto a substrate surface according to a desired pattern require time consuming multiple sequential steps. Each method, moreover, has various problems related to the degree of control and consistency which can be achieved. Accordingly, it would be an advancement in the art to provide improved methods for patterning multilayered coatings, including color-producing coatings, onto a substrate which allowed direct and simultaneous control of the pattern depth and of the location of coating material layers sequentially coated upon substantially the entire surface of a substrate. It would be a further advancement in the art to provide methods which deposited very little heat into the coating materials and which do not involve additional developing and removing steps or the use of additional potentially hazardous chemicals. Such methods are disclosed and claimed herein.

SUMMARY AND OBJECTS OF THE INVENTION

It is an object of the present invention to provide improved methods for patterning multi-layered, including multi-colored, coatings onto a substrate in a manner that permits direct and simultaneous control of the depth and location of the coating materials, including color producing materials to produce color filter arrays, applied to substantially the entire surface of a substrate.

It is a further object to provide methods for patterning multi-layered coatings onto a substrate in a manner that deposits very little heat into the coating materials.

It is yet another object to provide methods which allow for in situ patterning of multilayered coatings onto a substrate without the use of masking or photoselective removal of unwanted film.

An additional object is to provide methods for in situ patterning multilayered coatings that could be used in combination with vacuum deposition techniques and which allow for the vacuum deposition of multiple layers in the correct pattern to be achieved without requiring a vacuum break or time-consuming transfer of the substrate to other processing areas.

Finally, it is an object of the present invention to provide methods in which laser patterning could be used to remove and/or pattern any number of different coating layers, including color-producing coating layers, that might be applied onto a substrate. In particular, selective laser ablation is utilized to directly and simultaneously control the depth and location of colored filter materials coated upon substantially the entire surface of a substrate.

These and other objects and advantages of the invention will be better understood by reference to the detailed description, or will be appreciated by the practice of the invention.

The term "pattern" as used herein refers to a design for a coating layer on the surface of a substrate or the surface of a coating on a substrate. "Patterning" is the process of creating the selected design upon a surface resulting in formation of a "patterned" surface. To achieve the foregoing objects, and in accordance with the invention as embodied and broadly described herein, the methods of the present invention involve in situ laser patterning of thin-film layers during sequential deposition of the different layers. The layers may be applied using any known method of film deposition. The method of the present invention involves laser ablation to remove unwanted portions of the thin film coating layers, including color producing materials, that have been sequentially deposited onto substantially the entire surface of a substrate. Contrary to the prior art, by controlling the depth of the laser ablation removal of the deposited films, it is possible to remove any portion of a film or layers of films or coatings that have been sequentially coated onto the surface of the substrate and to thereby control the depth and location of the material layers coated upon the substrate.

This laser patterning process can be employed in conjunction with any film deposition technique known in the art but is preferred with vacuum deposition. Because both the coating and the selective removal of the coatings by laser ablation can be performed without breaking vacuum, in the case of vacuum deposition, the process greatly simplifies and increases the rate of production of multilayer coated arrays, including color filter arrays. In addition, this method allows for the construction of complex, patterned, thin film structures without the need for masking encountered with other patterning processes.

The laser patterning techniques of the present invention generally involves laser ablation to pattern sequentially deposited coating materials, such as colored dye, interference or absorbance-based thin film layers, or pixel materials, in order to selectively remove and thereby pattern each of the coating materials between sequential coating steps. The color filter array produced may optionally be coated with one or more protective coating layers. The depth of the laser ablation and, thus, the thickness of the coating materials, is controlled to provide the desired light throughput and spectral purity.

The methods of the present invention may be utilized to produce separate subassemblies for one or more of the colors of a color filter array. The subassemblies, for example, separate red, green and blue filter subassemblies, can then be joined together to produce a completed color filter array. Each subassembly is produced by laser ablating openings in a coating on a substrate, applying at least one color producing coating material to substantially the entire surface including the ablated area, and then laser ablating regions of the coated surface corresponding to a pattern for the other color producing coatings. The advantage to the subassembly approach is that any defects introduced during production will affect only one subassembly and will not affect the yield and the manufacture of the other subassemblies. Care must be taken during assembly of the separate subassemblies, however, to ensure proper alignment and maintenance of registry.

BRIEF DESCRIPTION OF THE DRAWINGS

In order that the manner in which the above-recited and other advantages and objects of the invention are obtained, a more particular description of the invention briefly described above will be rendered by reference to specific embodiments thereof illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 1A-1O are sectional views showing a preferred coating and patterning sequence to form a color filter array according to the present invention wherein:

FIG. 1A is a sectional view of a substrate that has been coated with a black matrix material;

FIG. 1O is a sectional view of the patterned substrate of FIG. 1N that has been coated with a protective coating layer to thereby form a color filter array having a selected pattern of three different color producing coatings of varying thicknesses separated by black matrix material.

FIGS. 2A–2M are sectional views showing a preferred coating and patterning sequence to form two corresponding subassemblies which can be joined together to form a color filter array according to the present invention wherein:

FIG. 2A is a sectional view of a substrate that has been coated with a black matrix material;

FIG. 2B is a sectional view of the coated substrate of FIG. 2A that has been laser patterned to form openings that will align with the positions of the desired color producing coating materials;

FIG. 2C is a sectional view of the patterned substrate of FIG. 2B that has been coated with a first color producing coating material;

FIG. 2D is a sectional view of the coated substrate of FIG. 2C that has been laser patterned to form openings that will align with the positions of the other color producing coating materials;

FIG. 2E is a sectional view of the patterned substrate of FIG. 2D that has been coated with a second color producing coating material;

FIG. 2F is a sectional view of the of the coated substrate of FIG. 2E that has been laser patterned to form openings that will align with the positions of the other color producing coating materials;

FIG. 2G is a sectional view of the patterned substrate of FIG. 2F that has been coated with a protective coating layer to thereby form a color filter subassembly;

FIG. 2H is a sectional view of a substrate that has been coated with a black matrix material;

FIG. 2I is a sectional view of the coated substrate of FIG. 2H that has been laser patterned to form openings that will align with the positions of the desired color producing coating materials;

FIG. 2J is a sectional view of the patterned substrate of FIG. 2I that has been coated with a color producing coating material;

FIG. 2K is a sectional view of the coated substrate of FIG. 2J that has been laser patterned to form openings that will align with the positions of the other color producing coating materials;

FIG. 2L is a sectional view of the patterned substrate of FIG. 2K that has been coated with a protective coating layer to thereby form a color filter subassembly;

FIG. 2M is a sectional view of the color filter subassembly of FIG. 2G that has been laminated to the color filter subassembly of FIG. 2L to thereby form a color filter array.

FIGS. 3A–3F are sectional views showing an alternative preferred coating and patterning sequence to form subassembly components which can be joined to corresponding subassemblies to form a color filter array according to the present invention wherein:

FIG. 3A is a sectional view of a substrate that has been coated with a black matrix material;

FIG. 3B is a sectional view of the coated substrate of FIG. 3A that has been laser patterned to form openings that will align with the positions of the desired color producing coating materials;

FIG. 3C is a sectional view of the patterned substrate of FIG. 3B that has been coated with a first color producing coating material;

FIG. 3D is a sectional view of the coated substrate of FIG. 3C that has been laser patterned to form openings that will align with the positions of the other color producing coating materials;

FIG. 3E is a sectional view of the patterned substrate of FIG. 3D that has been coated with a protective coating layer to thereby form a color filter subassembly;

FIG. 3F is a sectional view of the color filter subassembly of FIG. 3E that has been laminated to corresponding subassemblies of other colors formed according to the steps illustrated in FIGS. 3A–3E to thereby form a color filter array.

FIGS. 4A–4I are sectional views showing an alternative preferred coating and patterning sequence to form a color filter array according to the present invention wherein:

FIG. 4A is a sectional view of a substrate that has been coated with a black matrix material;

FIG. 4B is a sectional view of the coated substrate of FIG. 4A that has been laser ablated to form openings that will subsequently be filled with a first color producing coating material;

FIG. 4C is a sectional view of the patterned substrate of FIG. 4B that has been coated with a first color producing coating material;

FIG. 4D is a sectional view of the coated substrate of FIG. 4C that has been laser ablated to expose the underlying black matrix material and to form at least one opening that will subsequently be filled with a second color producing coating material;

FIG. 4E is a sectional view of the patterned substrate of FIG. 4D that has been coated with a second color producing coating material;

FIG. 4F is a sectional view of the coated substrate of FIG. 4E that has been laser ablated to expose the underlying black matrix material and the underlying first color producing coating material and to form at least one opening that will subsequently be filled with a third color producing coating material;

FIG. 4G is a sectional view of the patterned substrate of FIG. 4F that has been coated with a third color producing coating material;

FIG. 4H is a sectional view of the coated substrate of FIG. 4G that has been laser ablated to expose the underlying black matrix material and the underlying first and second color producing coating materials;

FIG. 4I is a sectional view of the patterned substrate of FIG. 4H that has been coated with an optional protective coating layer to thereby form a color filter array having a selected pattern of three different color producing coatings separated by black matrix material.

DETAILED DESCRIPTION OF THE PREFERRED EMBODIMENTS

Figure 1A:

As used herein, the term "pattern" refers to a design for a coating layer on the surface of a substrate or the surface of a coating on a substrate. "Patterning" is the process of creating the selected design upon a surface resulting in formation of a "patterned" surface. The present invention involves in situ laser patterning of thin film layers during sequential deposition using any known method of film deposition. The laser patterning process utilizes laser ablation to remove unwanted portions of coating materials, including color producing materials for color filter arrays, that have been sequentially deposited onto a substrate. By controlling the depth of the laser ablative removal of the deposited films, it is possible to remove any portion of one or more layers of thin film coating material that have been sequentially deposited onto the surface of the substrate.

The laser patterning process can be employed with any film deposition technique known in the art including vacuum, wet chemical or dry processing film deposition techniques, but is preferred with vacuum deposition. Because both the coating and the selective removal of the coatings by laser ablation can be performed without the need for masking or other interruptive processes and, in the case of vacuum deposition, without the need for breaking vacuum, the process greatly simplifies and increases the rate of production of coated arrays, including color filter arrays. In addition, laser ablation offers several advantages over masking: it is faster, the laser movement can be easily changed to create new designs or patterns without the expense of producing new masks, and additional mask treatment steps are not required.

In general, the various film deposition techniques that may be used in conjunction with the laser patterning techniques of the present invention include PVD and CVD vacuum deposition methods, wet chemical methods, including spin coating, dip coating precipitation from suspensions or solutions, draw downs, wet applicator bar coatings and sprays, and dry deposition processes including spray pyrolysis and laser ablation transfer. The substrate materials are well known and include rigid materials such as glass or rigid or flexible polymeric materials. The substrate may be transparent or could be a reflective material such as mirror-coated glass or a metal.

Prior to this invention, patterning films formed by vacuum deposition techniques required vacuum breaks between film deposition sequences in order to adjust masking. In addition, it was usually necessary to remove the substrate from the coating process region to create patterned layers when multiple layers or films having different patterning requirements were sequentially deposited onto the substrate. The method of the present invention overcomes these problems by the use of selective in situ removal of any region of one or more coating materials from the substrate during sequential film deposition. Importantly, the selective laser ablation removal of the desired region can be depth controlled in order to expose, but not completely remove, one or more different layers, such as different color-producing materials, that were deposited beneath one or more subsequently applied layers being removed.

In contrast to methods involving masking to define the interface or junction between the different colored regions, the laser patterning method of the present invention allows for much sharper junctions between the different color producing regions or between the coated and uncoated regions. This is because laser ablative removal of one or more coatings or regions of coatings from the substrate is much more precise than masking in creating the desired pattern.

The laser patterning methods of the present invention have utility in a variety of applications. One illustrative use is in the manufacture of active and passive display devices. Active devices include flat panel displays based on liquid crystals (LC), electroluminescent (EL) and/or electrochromic (EC) materials. Passive devices include color filters employing absorbing dyes or interference-based thin film filters including absorbance-based thin film filter. In general, colored pixel arrays are useful in a variety of applications, most notably in flat panel displays used in laptop computer monitors and soon to be extensively used in television monitors.

Active devices such as flat panel displays have three basic optical elements: a light source, a light intensity modulator, and in the case of color displays, a color selecting mechanism such as a filter. The effect of a color display in a flat panel display may be accomplished in a number of different ways. In an article entitled "Flat Panel Display Technology" *The Electrochemical Society Interface*, (Summer 1994) there are five basic types of flat panel display discussed. In some designs, the function of the three optical components is combined. For example, if one constructs an EL display, the light source and color selecting elements may be combined by using a light emitting thin film. A variety of EL phosphor materials for use in these films are commercially available, such as, for example, Sylvania-type 523 phosphor made from ZnS doped with Mn and Cu. Alternatively, a white light phosphor can be coupled to filters for color selectivity.

Currently, the liquid crystal display (LCD) is the dominant technology for flat panel displays on portable computers. There are two types of LCD displays, active matrix LCD and passive matrix LCD displays. The active matrix LCDs employ a thin film transistor to control the switching of the individual pixel elements and uses silicon integrated chip fabrication techniques for the thin film transistor construction. While colored filter construction will be given as an example of the construction process made possible by the laser pattern techniques of the present invention, it should be understood that the process disclosed herein is also applicable to the construction of active LC displays.

Construction of active devices such as flat panel displays by wet chemical methods involves many handling and processing steps, each of which can introduce defects into the color array. One of the advantages of the present invention is to combine laser patterning technology with vacuum coating technology for part or all of the construction of flat panel display, thereby eliminating wet chemical etching and photoresist altogether. Nevertheless, while not preferred, the use of laser patterning in combination with wet chemical deposition of thin films would certainly be within the scope of the present invention.

The preferred embodiment involves a sequence of coating steps using vacuum deposition techniques in combination with laser patterning of the deposited layer(s). The masking normally required to achieve controlled deposition of the colored film layers during vacuum deposition is replaced by laser patterning to remove the film from the areas where it is not desired after the film has been deposited. Important but not necessary to this application is the in situ combination of thin film coating and laser ablation technology. This sequence of steps, i.e., film deposition followed by laser patterning, can be repeated any number of desired times without venting the coating chamber to the atmosphere, or otherwise disrupting the coating chamber operating conditions, to achieve the final design requirements. This greatly simplifies and increases the speed of production of color filter arrays.

The exemplary film deposition and patterning methods outlined in FIGS. 1–4 of the present invention, to be discussed in more detail hereinafter, can be used to construct passive devices, such as color filters or subassemblies for active devices. The construction concepts of the present invention can be applied to make patterned color filters such as red green blue ("RGB") filters. In addition, the laser patterning methods of the present invention are also applicable to the construction of displays with active, or light generating, elements. These light generating elements include EL materials, light-emitting diodes, LC and EC materials.

In flat panel displays or projection displays with "white" light sources, subtractive color filters are usually employed to generate the RGB colors. In general, the current construction techniques for color filter arrays involve fabrication on a separate substrate using multiple photoresist steps. These color filters can be based on either absorbing dyes, or interference- or absorbance-based thin film optical designs. Generally, the multilayer thin film-based color filters yield more saturated colors than absorbing dye-based color filters. In addition, interference filters have the ability to withstand a greater light flux due to their non-absorbing nature, making them better suited for higher light flux applications. Using the construction techniques disclosed in FIGS. 1 through 4, interference-based as well as dye-based color filters may be coated and patterned.

The manufacture of color filters provides a straightforward illustration of the present technology. In this arrangement, color filter arrays could constitute a subassembly for an active device, with the light source as a separate element. Alternately, the light emitting element could be included as one of the first layers within the patterned design. Similarly, other active or conductive layers may be included in the practice of this invention.

An important feature of this invention is the control of material ablation depth. This is especially important for patterning interference thin film filters, but can be used to significant advantage with colored dye filters as well. In interference filters, the color effect achieved by a particular filter design depends on a combination of indices of refraction, absorption, and the thickness(es) of the coating material(s). Thus, absorbance-based thin film filters constitute a subset of interference-based thin film filters, and are included in this category.

The depth of ablation of a particular coating material depends on the optical absorption coefficient of the material at the wavelength of the emitted laser energy, the laser power density and the number of pulses of laser energy. Hence, the quantity of material ablated by each pulse can be determined such that the total depth of ablation can be controlled. In some cases it may be useful to modify the design structure of the colored array in a manner to allow for greater tolerances on the laser ablation depth control depending on the accuracy of the laser ablation technique being used. The designed-in tolerances will be especially important for the construction of interference-based thin film filters because the effectiveness depends on the thickness of the layers. If needed, an additional colorless material can be incorporated into the design that can be partially removed by the laser ablation methods without detrimentally affecting the color producing areas of the filter.

Reference will now be made to the FIGS. 1–4, which illustrate different patterning techniques made possible by the present invention. These shall be referred to hereinafter as Technique Nos. 1–3.

Technique No. 1

The process illustrated by Technique No. 1 generally involves laser ablation to pattern sequentially deposited coating materials, such as colored dye or pixel materials, in order to selectively remove and thereby pattern each of the coating materials between sequential coating steps. If desired, a layer of opaque material may be applied between each color filter material layer and selectively removed by laser ablation to form openings corresponding to a pixel pattern for successively applied color filter materials. The depth of the laser ablation and, thus, the thickness of the coatings, is controlled to provide the desired light throughput and spectral purity. In addition, the laser ablation process deposits very little heat in the coating and, thus, has minimal effect on those areas which are not intentionally ablated.

Figure 1B:
FIG. 1B is a sectional view of the coated substrate of FIG. 1A that has been laser patterned to form openings that will subsequently be filled with one of three different color producing coating materials.
Figure 1C:
FIG. 1C is a sectional view of the patterned substrate of FIG. 1B that has been coated with a first color producing coating material.
Figure 1D:
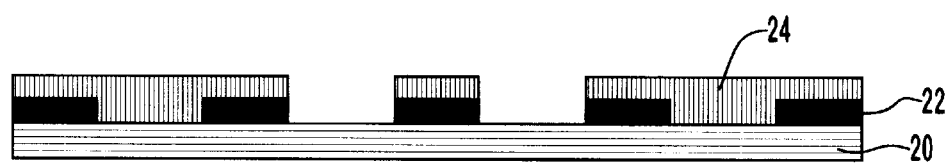
FIG. 1D is a sectional view of the coated substrate of FIG. 1C that has been laser patterned to form openings that will subsequently be filled with one of the two remaining color producing coating materials.
Figure 1E:
FIG. 1E is a sectional view of the patterned substrate of FIG. 1D that has been coated with a black matrix material.
Figure 1F:
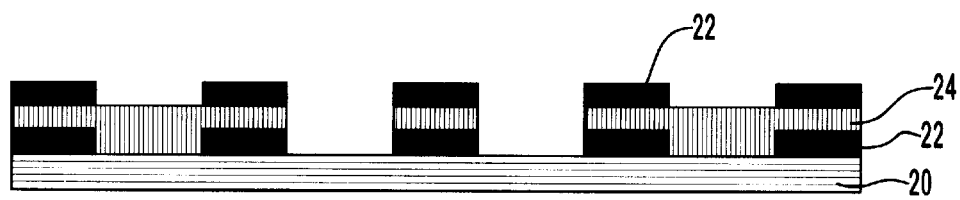
FIG. 1F is a sectional view of the coated substrate of FIG. 1E that has been laser patterned to selectively expose the underlying first color producing coating material and to form openings that will subsequently be filled with one of the two remaining color producing coating materials.
Figure 1G:
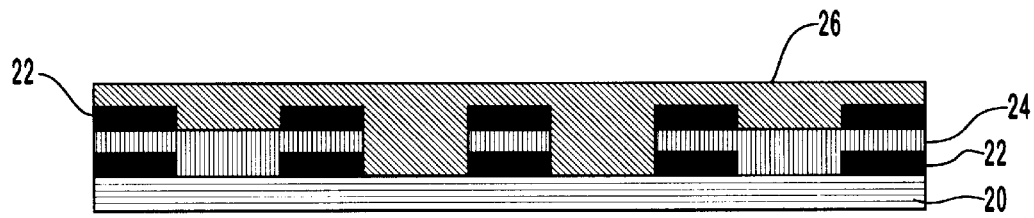
FIG. 1G is a sectional view of the patterned substrate of FIG. 1F that has been coated with a second color producing coating material.
Figure 1H:
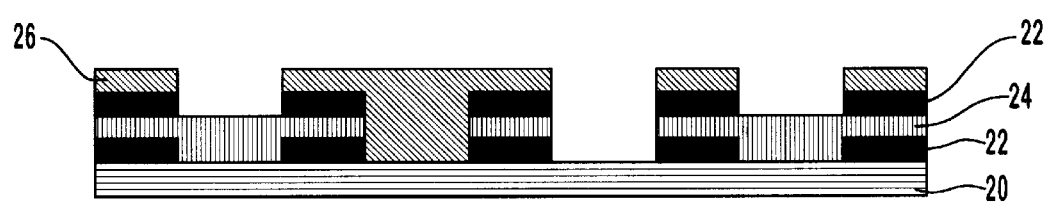
FIG. 1H is a sectional view of the coated substrate of FIG. 1G that has been laser patterned to selectively expose the underlying first color producing coating material and to form at least one opening that will subsequently be filled with the one remaining color producing coating material.
Figure 1I:
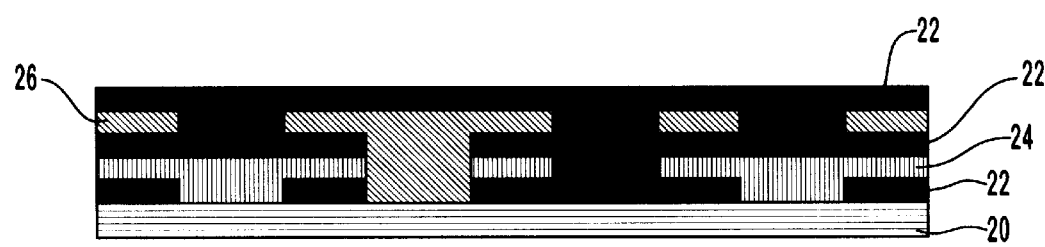
FIG. 1I is a sectional view of the patterned substrate of FIG. 1H that has been coated with a black matrix material.
Figure 1J:
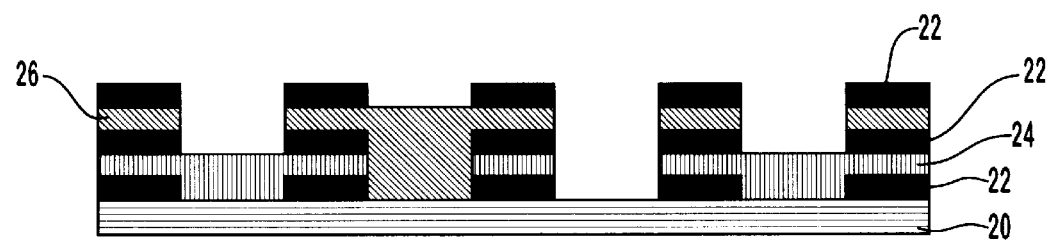
FIG. 1J is a sectional view of the coated substrate of FIG. 1I that has been laser patterned to selectively expose the underlying first and second color producing coating materials and to form at least one opening that will subsequently be filled with the one remaining color producing coating material.
Figure 1K:
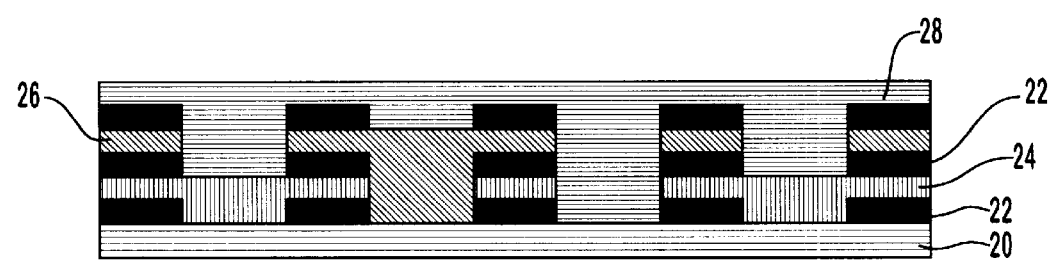
FIG. 1K is a sectional view of the patterned substrate of FIG. 1J that has been coated with a third color producing coating material.
Figure 1L:
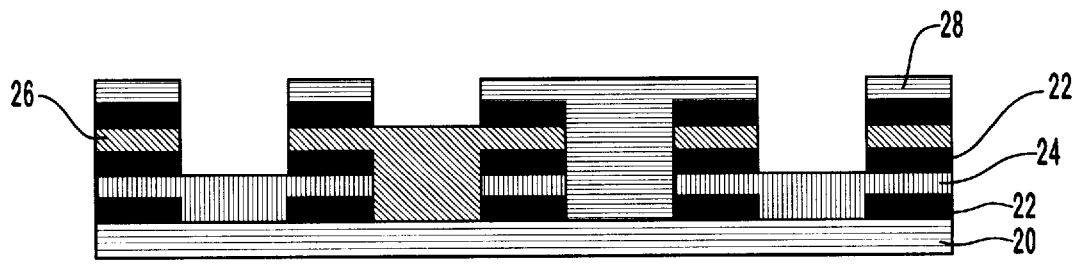
FIG. 1L is a sectional view of the coated substrate of FIG. 1K that has been laser patterned to selectively expose the underlying first and second color producing coating materials.
Figure 1M:
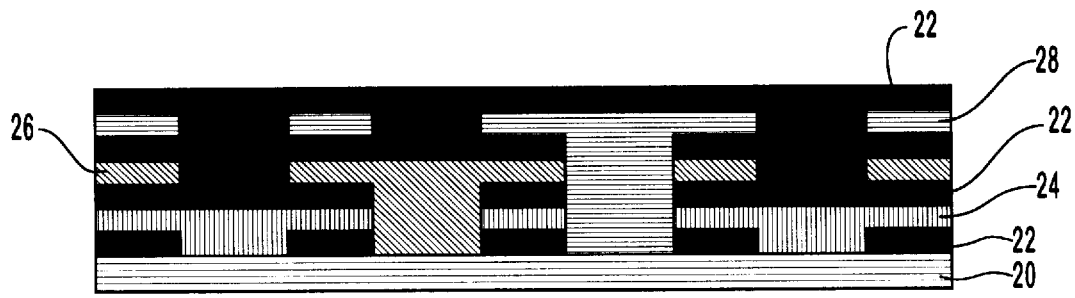
FIG. 1M is a sectional view of the patterned substrate of FIG. 1L that has been coated with a black matrix material.
Figure 1N:
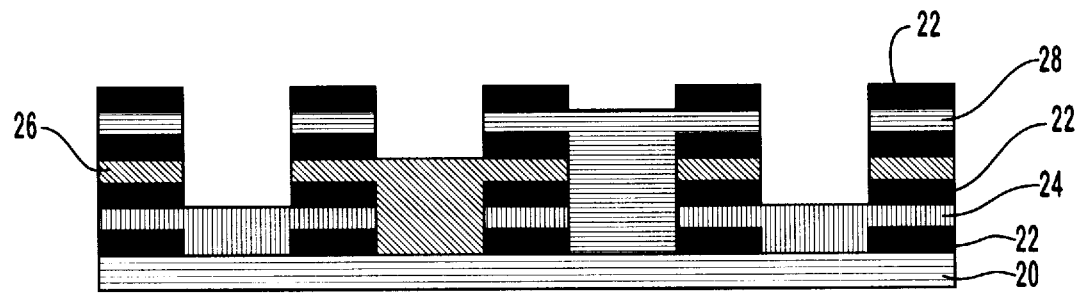
FIG. 1N is a sectional view of the coated substrate of FIG. 1M that has been laser patterned to selectively expose the underlying first, second, and third color producing coating materials.
Figure 1O:
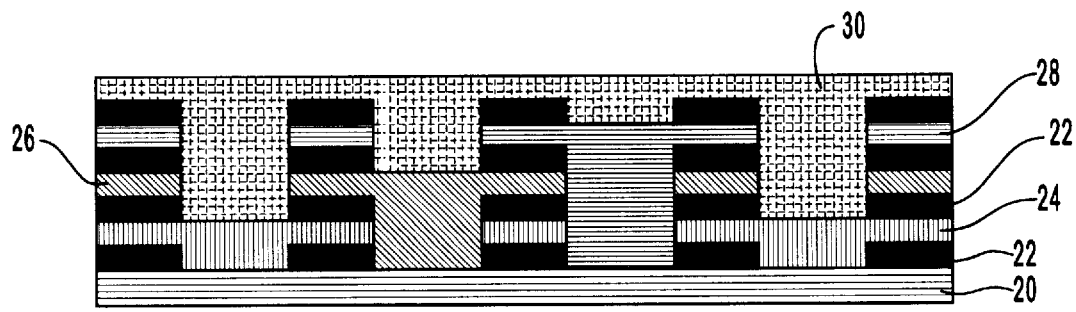

Referring more specifically to FIGS. 1A to 1O, a preferred coating and patterning sequence to form a RGB color filter array is illustrated. FIG. 1A shows a sectional view of a substrate 20, such as glass or a clear polymeric substance, that was completely coated with a black or other dark or opaque matrix material 22. The dark matrix material, as well as each subsequently applied colored filter material, can be applied by any film coating deposition technique known in the art, but is preferably applied by vacuum deposition. It will be appreciated that the illustrated method is applicable to other coating materials, such as electrode materials, as well as the exemplary red, green, and blue color coating materials referenced below. It will further be appreciated that the sequence of deposition of the exemplary red, green, and blue color coating materials is illustrative only and not restrictive.

FIG. 1B shows the coated substrate 20 that has been patterned by laser ablation to expose areas to be subsequently filled in with one or more desired colored filter materials. In particular, the dark or opaque matrix material 22 is removed wherever an area has been designated as a pixel position (i.e., wherever it is desired to transmit light through the red, blue, or green filter areas, respectively). FIG. 1C shows a sectional view of the coated and patterned substrate 20 of FIG. 1B having a red colored coating material 24 deposited upon substantially the entire substrate surface, including areas where the dark matrix material was removed by laser ablation and areas where the dark matrix material 22 remained. As explained above, a preferred method of deposition is vacuum deposition but other methods may be used. FIG. 1D illustrates the coated substrate of FIG. 1C that has been patterned by laser ablation to re-expose areas to be subsequently filled in with other desired colored filter materials, i.e., the green and blue pixel positions.

As seen in FIG. 1E, a second layer of dark or opaque matrix material 22 is next applied to substantially the entire surface of the patterned substrate shown in FIG. 1D. The dark or opaque matrix material is subsequently laser patterned, as shown in FIG. 1F, to selectively expose the underlying red coating material within the red pixel positions and to re-expose the areas to be subsequently filled in with the green and blue color coatings. FIG. 1F therefore illustrates an intermediate coated and patterned substrate having a properly patterned red coating material 24 in which the dark or opaque matrix material has been patterned to expose each of the colored pixel positions.

FIG. 1G illustrates a green colored coating material 26 deposited upon substantially the entire surface of the patterned substrate shown in FIG. 1F. The green colored coating material is processed in a similar manner to the red colored coating material. In particular, the green colored coating material is laser patterned to expose the underlying red colored coating material and to re-expose the areas to be subsequently filled in with the blue colored coating material, as shown in FIG. 1H; a third layer of dark or opaque matrix material 22 is applied, as shown in FIG. I; and the third opaque layer is laser patterned to selectively expose the underlying red and green coating materials within their respective pixel positions and to re-expose the areas to be subsequently filled in with the blue colored coating material, as shown in FIG. 1J. The green coating material is therefore laser patterned to expose the red and blue pixel positions, while the dark or opaque matrix material is laser patterned to once again expose the red, blue and green pixel positions. FIG. 1J therefore illustrates an intermediate coated and patterned substrate having properly patterned red and green coating materials in which the dark or opaque matrix material has been patterned to expose each of the colored pixel positions.

FIG. 1K illustrates a blue colored coating material 28 deposited upon substantially the entire surface of the patterned substrate of FIG. 1J. The blue colored coating material is processed in a similar manner to the red and green colored coating materials. Accordingly, the blue colored coating material is laser patterned to expose the underlying red and green colored coating materials, as shown in FIG. 1L; a fourth layer of dark or opaque matrix material 22 is applied, as shown in FIG. 1M; and the fourth opaque layer is laser patterned to selectively expose the underlying red, green, and blue coating materials within their respective pixel positions, as shown in FIG. 1N. The blue coating material is therefore laser patterned to expose the red and green pixel positions, while the dark or opaque matrix material is laser patterned to once again expose the red, blue and green pixel positions. FIG. 1N therefore illustrates a completed coated and patterned substrate having properly patterned red, green and blue coating materials in which each of the subsequently applied dark or opaque matrix material layers has been patterned in each instance to expose the colored pixel positions.

FIG. 1O is a sectional view of the completed coated and patterned substrate of FIG. 1N that has been optionally coated with a protective layer 30. Suitable mechanical protective layers are known in the art and include various polymers and dielectrics such as $SiO_2$, $Al_2O_3$, and diamond-like carbon. As shown in FIG. 1O, the protective layer is illustrated as forming a generally smooth upper surface by filling in the valleys left by the laser patterning processes shown in FIGS. 1A–1N. While this is probably true to some extent, it should be understood that the laser patterning sequences shown in FIGS. 1A–1N are merely illustrative and are not necessarily drawn to scale. Accordingly, one of ordinary skill in the art would expect the holes that are created by the laser patterning sequences of FIGS. 1A–1N might have aspect ratios of, e.g., about 50:1 (width to depth). Therefore, the actual edge effect would be expected to be nominal. However, because it will ordinarily be very important to have a very smooth surface, what little edge effect that there is should be overcome by ensuring that the protective coating material is applied very thinly. Spin coating is an example of a coating process that gives an acceptably smooth surface.

Technique No. 2

The color filter instruction technique identified as Technique No. 2 comprises producing separate subassemblies for one or more of the colors of a color filter array. The subassemblies, for example, separate red, green and blue filter subassemblies, can then be joined together to produce a RGB color filter array. The individually fabricated color filter subassemblies are typically laminated together. Each subassembly is produced by laser ablating openings in a coating on a substrate, applying at least one colored coating color to substantially the entire ablated surface, and then laser ablating regions of the coated surface corresponding to a pattern for the other colors. To reduce parallax between interference-based color filters, it may be preferable to join only two separate subassemblies with the substrate layers at the outermost surfaces and the color filter materials in between. For example, for a RGB color filter array, two of the colors could be coated onto one substrate and the remaining color onto another substrate.

The advantage to the subassembly approach is that any defects introduced during production will affect only one subassembly and will not affect the yield and the manufacture of the other subassemblies. Care must be taken during assembly of the separate subassemblies, however, to ensure proper alignment and maintenance of registry. As described above with respect to FIG. 1, the depth of the laser ablation and, thus, the thickness of the coatings, is controlled to provide the desired light throughput and spectral purity. In addition, the laser ablation process deposits very little heat in the coating and, thus, has minimal effect on those areas which are not intentionally ablated.

Figure 2A:

A preferred method for producing a RGB color filter array from two subassembly components is illustrated in FIGS. 2A to 2N. FIG. 2A shows a sectional view of a substrate 20, such as glass or a clear polymeric substance, that was completely coated with a black or other dark or opaque matrix material 22. The dark matrix material, as well as each subsequently applied colored filer material, can be applied by any film coating deposition technique known in the art, but is preferably applied by vacuum deposition. It will be appreciated that the illustrated method is applicable to other coating materials as well as the exemplary red, green, and blue color coating materials referenced below.

Figure 2B:
Figure 2C:

FIG. 2B shows the coated substrate 20 that has been patterned by laser ablation to expose regions corresponding to the regions to be subsequently filled in with one or more desired colored filter materials. In particular, the dark or opaque matrix material 22 is removed wherever an area has been designated as a pixel position (i.e., wherever it is desired to transmit light through the red, blue, or green filter areas, respectively). FIG. 2C shows a sectional view of the coated and patterned substrate of FIG. 2B having a red colored coating material 24 deposited upon substantially the entire substrate surface, including areas where the dark matrix material was removed by laser ablation and areas where the dark matrix material remained. As explained above, a preferred method of deposition is vacuum deposition but other methods may be used.

Figure 2D:

FIG. 2D illustrates the coated substrate of FIG. 2C that has been patterned by laser ablation to re-expose regions corresponding to the regions to be subsequently filled in with, or aligned with, the other desired colored filter materials, i.e., the green and blue pixel positions. As explained with respect to FIG. 1 above, the aspect ratio of the holes exposed by laser ablation would be expected to have a much larger aspect ratio than is represented in the drawings.

Figure 2E:
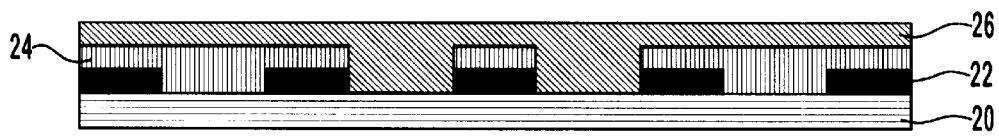
Figure 2F:
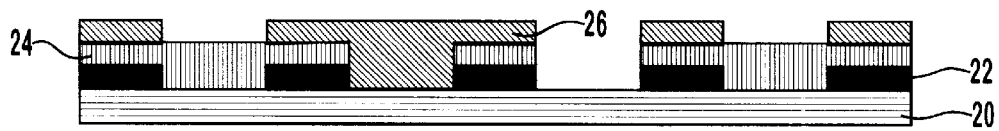

Next, FIG. 2E illustrates the step of coating substantially the entire surface of the patterned substrate of FIG. 2D with a green colored coating material 26. FIG. 2F illustrates the coated substrate of FIG. 2E that has been patterned by laser ablation to re-expose regions corresponding to the regions to be subsequently filled in with, or aligned with, the other desired colored filter materials, i.e., the blue pixel positions. Accordingly, FIG. 2F shows a two-color subassembly which can be coated with a protective coating 30 as seen in FIG. 2G.

Figure 2G:
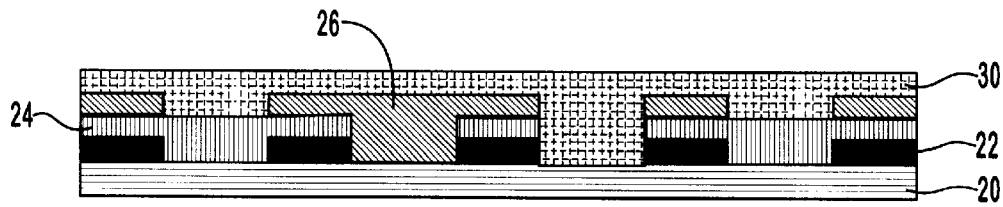
Figure 2H:
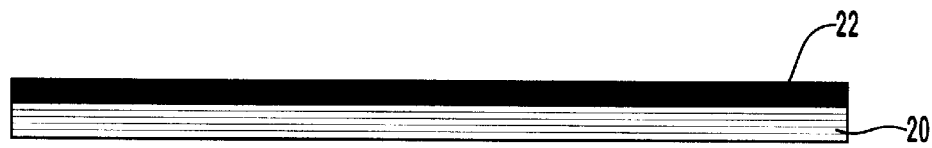
Figure 2I:
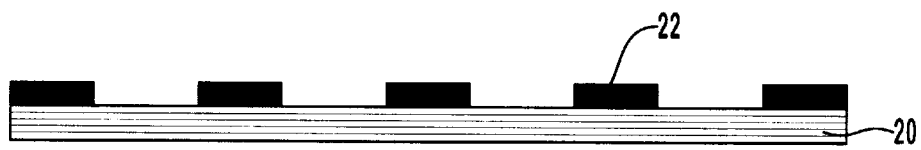
Figure 2J:
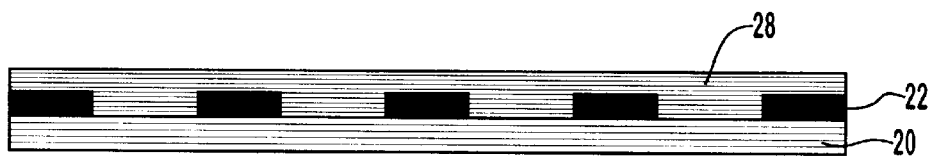
Figure 2K:
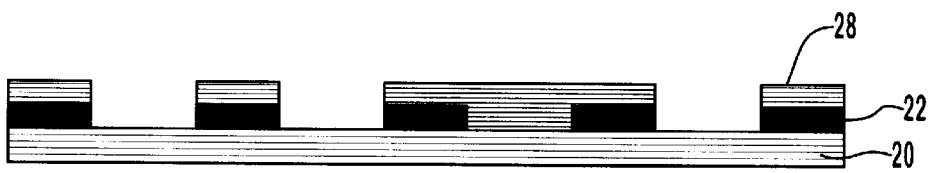
Figure 2L:
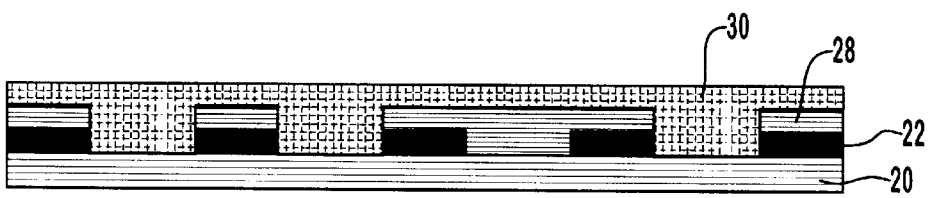

A second subassembly component comprising the blue colored filter material is produced in a similar manner as is shown in FIGS. 2H through 2M. The steps illustrated in FIGS. 2H through 2K are nearly identical to the steps described above with respect to FIGS. 2A through 2D. In particular, a substrate 20 is coated with a black or other dark or opaque matrix material 22 (FIG. 2H); the black matrix material is patterned by laser ablation to expose regions corresponding to the regions to be subsequently filled in with, or aligned with, the red, green, and blue colored filter materials (FIG. 2I); a blue colored coating material 28 is deposited upon substantially the entire substrate surface (FIG. 2J); and the coated substrate is patterned by laser ablation to re-expose areas to be aligned with the other desired colored filter materials, i.e., the red and green pixel positions (FIG. 2K). FIG. 2K, therefore, shows an uncoated blue filter subassembly. FIG. 2L shows the blue filter subassembly of FIG. 2K to which an optional protective coating layer 30 has been applied by any appropriate method.

Figure 2M:
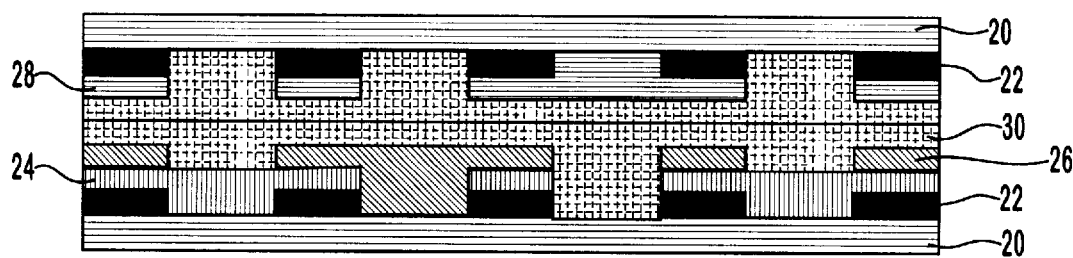

FIG. 2M illustrates the completed color filter array in which the two-color coated subassembly, illustrated in FIG. 2G, has been joined to the single-color coated subassembly illustrated in FIG. 2L. The subassemblies should be laminated or otherwise joined together in a manner that maintains accurate registry of the pixel positions. It is also preferable to join the subassemblies such that an intervening substrate layer is avoided. Thus, as shown in FIG. 2M, the two separate subassemblies are joined with the substrate layers at the outermost surfaces and the color filter materials in between the substrate layers.

Figure 3A:
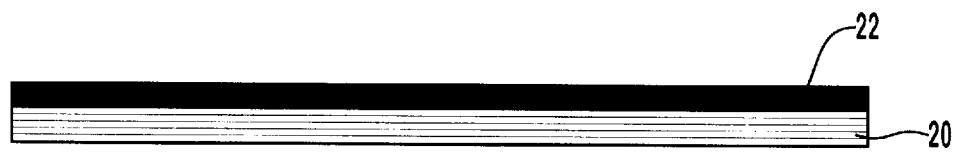
Figure 3B:
Figure 3C:
Figure 3D:
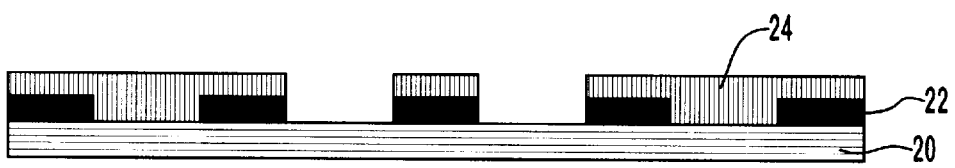
Figure 3E:
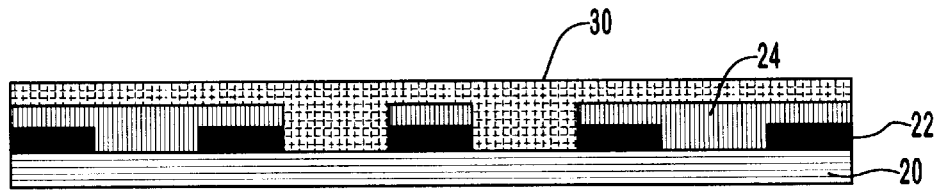

An alternative method for producing a RGB color filter array from three subassembly components is illustrated in FIGS. 3A to 3F. The steps illustrated in FIGS. 3A through 3D are identical to the steps described above with respect to FIGS. 2A through 2D. In particular, a substrate 20 is coated with a black or other dark or opaque matrix material 22 (FIG. 3A); the coated substrate is patterned by laser ablation to expose areas to be subsequently filled in with, or aligned with, the red, green, and blue colored filter materials (FIG. 3B); a red colored coating material 24 is deposited upon substantially the entire substrate surface (FIG. 3C); and the coated substrate is patterned by laser ablation to re-expose areas to be aligned with the other desired colored filter materials, i.e., the green and blue pixel positions (FIG. 3D). FIG. 3D, therefore, shows an uncoated red filter subassembly. FIG. 3E shows the red filter subassembly of FIG. 3D to which an optional protective coating layer 30 has been applied by any appropriate method.

A corresponding green filter subassembly and a corresponding blue filter subassembly will be made in the same manner described above with respect to the single-color red filter subassembly, illustrated in FIGS. 3A through 3E. This method is also illustrated, specifically with respect to a blue filter subassembly, in FIGS. 2H through 2L.

Figure 3F:
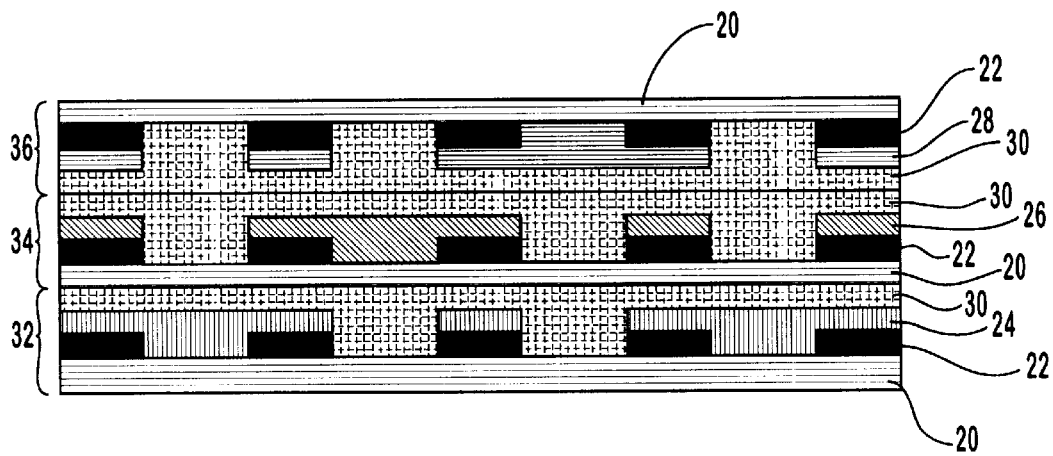

FIG. 3F is a sectional view of the assembled color filter array made by joining the separately manufactured corresponding red, green, and blue subassemblies. The red filter subassembly 32 shown in FIG. 3E is thus joined to a corresponding green filter subassembly 34 and a corresponding blue filter subassembly 36. The red, green and blue filter subassemblies should be laminated or otherwise joined together in a manner that maintains accurate registry of the pixel positions.

Technique No. 3

The filter construction method identified as Technique No. 3 is similar to Technique No. 1, except that rather than applying successive opaque material layers between the color filter material layers, a relatively thick initial opaque layer is applied and successively diminished during ablation of each successively applied color filter material. In its simplest embodiment, this deposition technique can be used for the construction of absorbing dye based color filter arrays. This technique could also be used for the construction of thin film interference filter designs with the incorporation of laser-sensitive spacer layers. The control of laser ablation depth would be used to selectively remove the spacer material such that the thicknesses of the thin film layers of the interference color filter design are maintained.

Figure 4A:
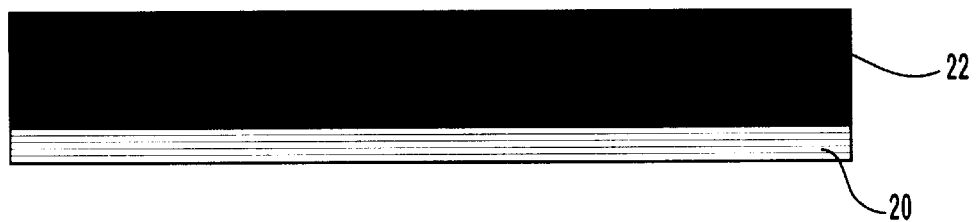

Referring more specifically to FIGS. 4A to 4I, a preferred coating and patterning sequence to form a RGB color filter array is illustrated. FIG. 4A shows a sectional view of a substrate 20, such as glass or a clear polymeric substance, that was completely coated with a black or other dark or opaque matrix material 22. The thickness of the dark or opaque matrix material is preferably somewhat greater than the desired final thickness in order to allow for successive diminution of the matrix material during the subsequent laser ablation patterning steps. The dark matrix material, as well as each subsequently applied colored filer material, can be applied by any film coating deposition technique known in the art, but is preferably applied by vacuum deposition. It will be appreciated that the illustrated method is applicable to other coating materials as well as the exemplary red, green, and blue color coating materials referenced below.

Figure 4B:
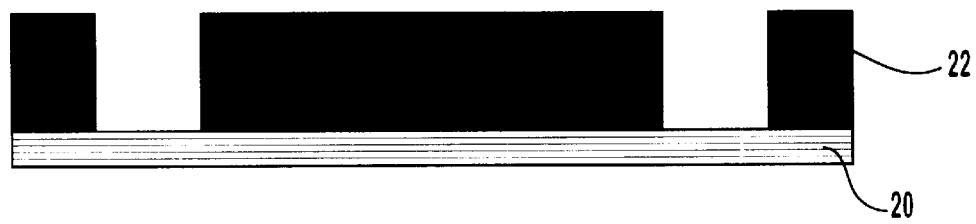

FIG. 4B shows the coated substrate 20 that has been patterned by laser ablation to expose areas to be subsequently filled in with a selected coating material. For example, a pattern of openings corresponding to a pixel pattern for a first color may be formed as shown in FIG. 4B where the dark or opaque matrix material 22 has been removed wherever an area has been designated as a red colored pixel position. As explained with respect to FIG. 1 above, the aspect ratio of the holes exposed by laser ablation would be expected to have a much larger aspect ratio than is represented in the drawings.

Figure 4C:
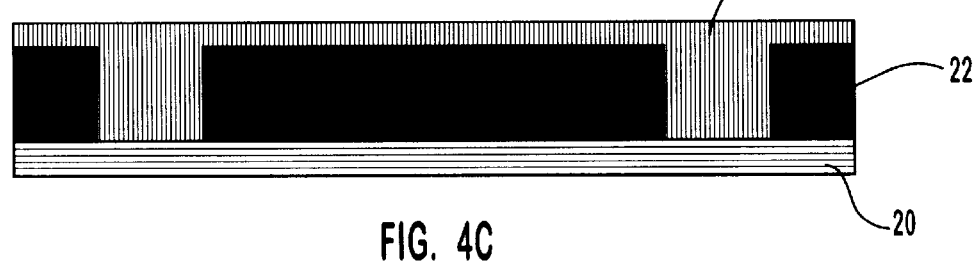

FIG. 4C shows a sectional view of the coated and patterned substrate of FIG. 4B having a red colored coating material 24 deposited upon substantially the entire substrate surface, including areas where the dark matrix material was removed by laser ablation and areas where the dark matrix material remained. The red colored coating material is thus applied to the entire substrate surface such that the ablated pattern regions are filled and substantially the entire surface of the remaining opaque matrix material is coated. As explained above, a preferred method of deposition is vacuum deposition but other methods may be used. FIG. 4C thus illustrates a sectional view of the coated and patterned substrate of FIG. 4B to which a red coating material has been applied to the entire surface to form an intermediate coated and patterned substrate.

Figure 4D:

FIG. 4D illustrates the coated substrate of FIG. 4C that has been patterned by laser to remove the red colored coating material to a depth which exposes the underlying opaque matrix material and creates openings in the opaque matrix material 22 corresponding to a pattern for a second coating material, such as green colored coating material. It will be appreciated that some diminution of the thickness of the original opaque matrix material 22 may occur during this step. In particular, because of the edge effect at the interface between the black matrix material and the red pixel positions, and because the coating processes do not produce perfectly smooth coatings, it will generally be necessary to remove a portion of the surface of the dark or opaque matrix material beneath the red coating material to ensure the clean and complete removal of the red coating material from all areas that do not correspond to the red pixel positions. FIG. 4D therefore illustrates an intermediate coated and patterned substrate having a properly patterned red coating material in which the dark or opaque matrix material has been patterned to expose the green pixel positions.

Figure 4E:
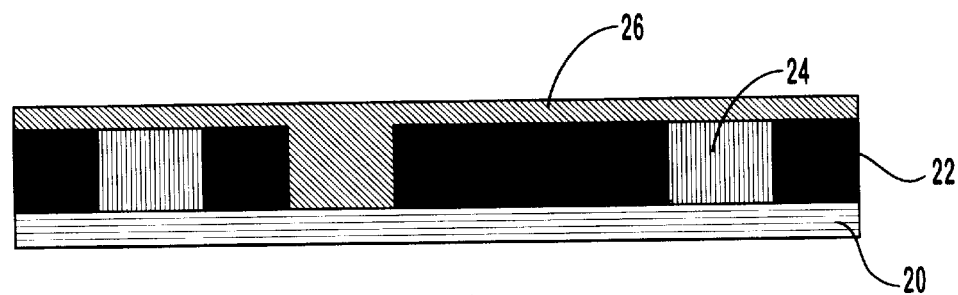

FIG. 4E is a sectional view of the coated and patterned substrate of FIG. 4D to which a green coating material 26 has been applied to the entire surface to form another intermediate coated and patterned substrate. As shown, the green colored coating material 26 is applied to the entire substrate surface such that the ablated pattern regions are filled and substantially the entire surface of the red coating material 24 and the remaining opaque matrix material 22 is coated.

Figure 4F:
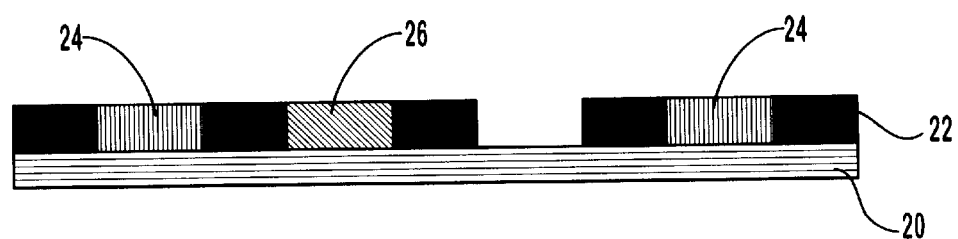

FIG. 4F illustrates the coated substrate of FIG. 4E that has been patterned by laser to remove the green colored coating material 24 to a depth which exposes the underlying red coating and opaque matrix material and which creates openings in the opaque matrix material 22 corresponding to a pixel pattern for a third coating material, such as blue colored coating material. In particular, the entire top surface of the intermediate coated and patterned substrate of FIG. 4E is laser ablated to a depth that cleanly exposes the black or opaque matrix material that remains (i.e., where it has not been completely removed in one of the color pixel positions), as well as the red pixel positions, and in order to level the top surface. It will generally be necessary to remove a portion of the surface of the dark or opaque matrix material and a portion of the surface of the red coating material beneath the green coating material to ensure the clean and complete removal of the green coating material from all areas that do not correspond to the green pixel positions. The laser patterning process of FIG. 4F also includes the removal of the dark or opaque matrix material in the blue pixel positions. FIG. 4F therefore illustrates an intermediate coated and patterned substrate having properly patterned red and green coating materials in which the dark or opaque matrix material has been patterned to expose the blue pixel positions.

Figure 4G:
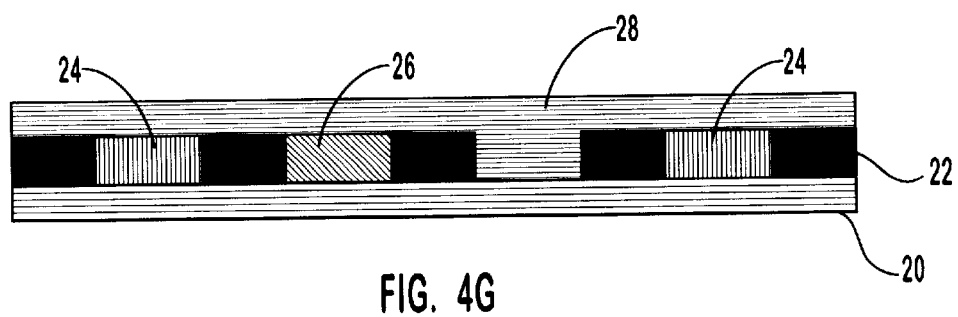

FIG. 4G is a sectional view of the coated and patterned substrate of FIG. 4F to which a blue coating material 28 has been applied to the entire surface to form another intermediate coated and patterned substrate. As shown, the blue colored coating material 28 is applied to the entire substrate surface such that the ablated pattern regions are filled and substantially the entire surface of the red coating material 24, the blue coating material 26, and the remaining opaque matrix material 22 is coated.

Figure 4H:
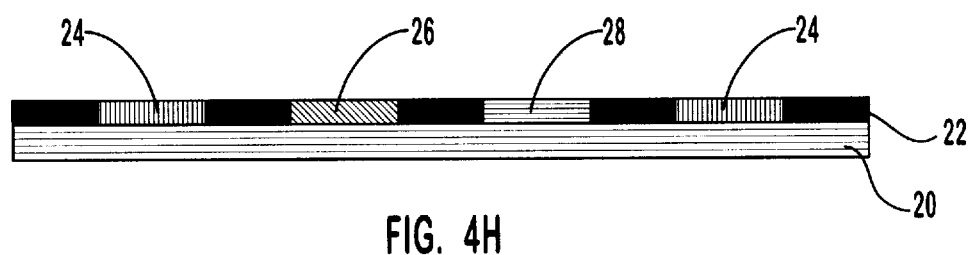

FIG. 4H illustrates the coated substrate of FIG. 4G that has been patterned by laser to remove the blue colored coating material 28 to a depth which exposes and levels the underlying red and green coatings and the opaque matrix material. In this manner, a color filter is produced wherein each region of coating material on the final coated substrate has the same thickness. It will be appreciated that regions having different thicknesses could also be obtained. It will be further appreciated that additional spacer layers of laser-sensitive materials could be incorporated such that selective removal of the spacer material would permit production of a design having color producing material layers of different thicknesses.

Figure 4I:
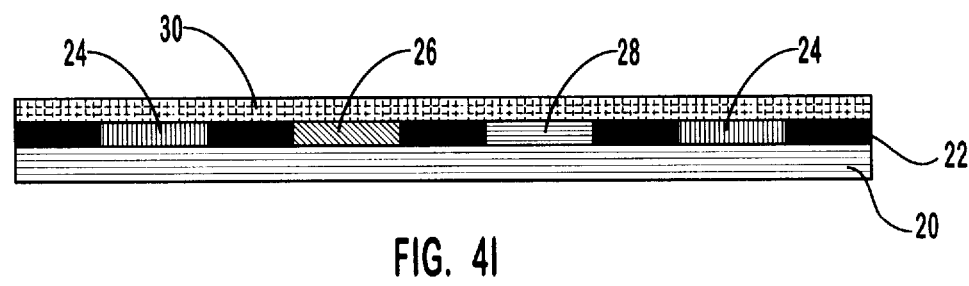

FIG. 4I is a sectional view of the completed coated and patterned substrate of FIG. 4H that has been optionally coated with a protective layer 30. Because the overall depth of the color filter array is diminished in each of the successive laser ablation steps, the initial depth of the dark or opaque matrix material, as well as the depth of each of the successively applied color coating materials must be sufficient to allow for complete and clean exposure of the desired underlayers while not inadvertently removing the coating materials from areas where they belong or rendering the colored layers so thin that they do not adequately perform their intended light filtration functions.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for patterning a plurality of different and sequentially applied coating materials to form a coated substrate, the method comprising steps of:

(a) providing a first substrate having a first substrate surface to be coated;

(b) applying a first coating material to substantially all of the first substrate surface;

(c) removing one or more regions of the first coating material to a first controlled depth by laser ablation to form a first patterned surface having regions coated with said first coating material and regions without coating;

(d) applying at least a second coating material to substantially all of the first patterned surface; and (e) removing one or more regions of the second coating material to a plurality of second controlled depths by laser ablation to form a second patterned surface having a plurality of different regions selected from the group consisting of regions coated with said second coating material overlying said first coating material, regions coated with said first coating material and regions without coating.

2. A method as defined in claim 1, further comprising a step of applying a third coating material to substantially all of the second patterned surface and a step of removing one or more regions of the third coating material to a plurality of third controlled depths by laser ablation to form a third patterned surface having a plurality of different regions selected from the group consisting of regions coated with said third coating material overlying said second and first coating materials, regions coated with said second coating material overlying said first coating material, regions coated with said first coating material and regions without coating.

3. A method as defined in claim 2, further comprising a step of applying at least one additional coating material to substantially all of said first substrate surface, wherein said first substrate surface includes a previously formed patterned surface thereon, said previously formed patterned surface being any of said first, second and third patterned surfaces, and a step of removing one or more regions of said additional coating material to a plurality of fourth controlled depths by laser ablation to form a successively patterned surface having a plurality of different regions selected from the group consisting of regions coated with any additional coating material overlying said previously formed patterned surface, regions coated in accord with any said previously formed patterned surface, and regions without coating.

4. A method as defined in claim 3 further comprising a step of applying a protective coating material to a patterned surface formed on said first substrate, said patterned surface selected from the group consisting of said first patterned surface, said second patterned surface, said third patterned surface and said successively patterned surface.

5. A method as defined in claim 1 further comprising steps of:

(1) providing at least a second substrate having a second substrate surface to be coated;

(2) treating the second substrate surface according to the steps (b) through (e) of claim 1 with respect to said first substrate surface; and (3) joining the second substrate and the first substrate such that the second patterned surface on both said second substrate and said first substrate are substantially aligned.

6. A method as defined in claim 5, further comprising additional steps between the recited steps (2) and (3), said additional steps including a step of applying to said second substrate surface, having a second patterned surface formed thereon, a third coating material to substantially all of the second patterned surface and a step of removing one or more regions of the third coating material to a plurality of third controlled depths by laser ablation to form a third patterned surface having a plurality of different regions selected from the group consisting of regions coated with said third coating material overlying said second and first coating materials, regions coated with said second coating material overlying said first coating material, regions coated with said first coating material and regions without coating.

7. A method as defined in claim 6, further comprising a step of applying at least one additional coating material to substantially all of said second substrate surface, wherein said second substrate surface includes a previously formed patterned surface thereon, said previously formed patterned surface being any of said first, second and third patterned surfaces, and a step of removing one or more regions of said additional coating material to a plurality of fourth controlled depths by laser ablation to form a successively patterned surface having a plurality of different regions selected from the group consisting of regions coated with any additional coating material overlying said previously formed patterned surface, regions coated in accord with any said previously formed patterned surface, and regions without coating.

8. A method as defined in claim 5, further comprising additional steps between the recited steps (2) and (3), said additional steps including a step of obtaining a third substrate having a third substrate surface to be coated, a step of treating said third substrate surface according to the steps (b) through (e) of claim 1 with respect to said first substrate surface, and a step of joining said third substrate to at least one of said first substrate and said second substrate such that the second patterned surfaces thereon are substantially aligned.

9. A method as defined in claim 1 wherein the substrate comprises glass.

10. A method as defined in claim 1 wherein the substrate comprises a material reflective to selected light energy.

11. A method as defined in claim 1 wherein the substrate comprises an optically transparent polymeric material.

12. A method as defined in claim 1 wherein each of the plurality of different coating materials are applied by a method selected from the group consisting of roller coating, meniscus coating, wet applicator bar coating, spray coating, spin coating, extrusion coating, ink jet printing, offset printing, screen printing, and flexographic printing.

13. A method as defined in claim 1 wherein the plurality of different coating materials are applied by vacuum deposition.

14. A method as defined in claim 1 wherein a vacuum is maintained throughout each of the steps (b) through (e).

15. A method as defined in claim 1 wherein the plurality of different coating materials are applied by a combination of vacuum deposition and wet chemical coating.

16. A method as defined in claim 1 wherein the plurality of different coating materials are applied by thermal transfer.

17. A method as defined in claim 1 wherein the plurality of different coating materials are applied by electrodeposition.

18. A method as defined in claim 1 wherein the plurality of different coating materials comprise color filter dyes.

19. A method as defined in claim 1 wherein the plurality of different coating materials comprise interference thin film filter materials.

20. A method for manufacturing a substrate component for a color filter array, said method comprising the method as defined in claim 1 wherein one of said plurality of different coating materials is an opaque coating material.

* * * * *